ated:(12) United States Patent
Yang et al.

(10) Patent No.: US 11,461,488 B2
(45) Date of Patent: Oct. 4, 2022

(54) UNIVERSAL ACCESS LAYER FOR ACCESSING HETEROGENEOUS DATA STORES

(71) Applicant: Allstate Insurance Company, Northbrook, IL (US)

(72) Inventors: Kevin Yang, Fremont, CA (US); Hruday Kamble, Roseville, CA (US); Avinash Gupta, 95747, CA (US)

(73) Assignee: Allstate Insurance Company, Northbrook, IL (US)

( * ) Notice: Subject to any disclaimer, the term of this patent is extended or adjusted under 35 U.S.C. 154(b) by 6 days.

(21) Appl. No.: 16/838,319

(22) Filed: Apr. 2, 2020

(65) Prior Publication Data

US 2021/0312065 A1   Oct. 7, 2021

(51) Int. Cl.
| | |
|---|---|
| *H04L 29/06* | (2006.01) |
| *G06F 21/62* | (2013.01) |
| *G06F 21/60* | (2013.01) |
| *G06F 21/44* | (2013.01) |

(52) U.S. Cl.
CPC .......... *G06F 21/6218* (2013.01); *G06F 21/44* (2013.01); *G06F 21/602* (2013.01)

(58) Field of Classification Search
CPC .............................. G06F 21/6218; G06F 21/44
See application file for complete search history.

(56) References Cited

U.S. PATENT DOCUMENTS

| | | | |
|---|---|---|---|
| 6,434,628 | B1 | 8/2002 | Bowman-Amuah |
| 6,999,956 | B2 | 2/2006 | Mullins |
| 7,392,255 | B1 | 6/2008 | Sholtis et al. |
| 7,836,065 | B2 | 11/2010 | Hackmann |
| 9,152,643 | B2 | 10/2015 | Whitehead et al. |
| 9,270,449 | B1 | 2/2016 | Tribble et al. |
| 9,686,118 | B1 | 6/2017 | Massaguer et al. |
| 9,740,757 | B1 | 8/2017 | Gilder et al. |
| 10,033,702 | B2 | 7/2018 | Ford et al. |
| 10,108,794 | B2 | 10/2018 | Bouse |
| 10,120,915 | B2 | 11/2018 | Sundaram P |
| 2003/0004931 | A1 | 1/2003 | Soetarman et al. |

(Continued)

FOREIGN PATENT DOCUMENTS

KR   100890209 B1   3/2009

OTHER PUBLICATIONS

Jul. 2, 2019, John Thuma/Big Data Ecosystem, "Five Things that Make A Great Universal Semantic", 3 Pages.

(Continued)

*Primary Examiner* — Jason K Gee
(74) *Attorney, Agent, or Firm* — Polsinelli PC

(57) ABSTRACT

Methods and systems disclosed herein describe a universal access layer that allows a plurality of applications to obtain data and/or information from a plurality of heterogeneous data stores. The universal access layer may include one or more application data objects to validate requests, transform a format of the request, determine which data stores comprise the requested data and/or information, encrypt the request, combine responses into a single response, and retransform the response prior to sending it to the requesting application. By using the universal access layer, applications may improve the speed with which they access data and/or information from the plurality of heterogeneous data stores.

20 Claims, 6 Drawing Sheets

(56) References Cited

U.S. PATENT DOCUMENTS

| | | | |
|---|---|---|---|
| 2007/0100793 A1* | 5/2007 | Brown | G06F 16/25 |
| 2007/0106754 A1 | 5/2007 | Moore | |
| 2008/0208806 A1 | 8/2008 | Dalfo et al. | |
| 2011/0246550 A1* | 10/2011 | Levari | G06F 16/244 |
| | | | 709/201 |
| 2013/0332984 A1* | 12/2013 | Sastry | H04L 63/102 |
| | | | 726/1 |
| 2014/0129457 A1 | 5/2014 | Peeler | |
| 2014/0192709 A1* | 7/2014 | Murias | H04L 63/0428 |
| | | | 370/328 |
| 2015/0199410 A1 | 7/2015 | Redlich et al. | |
| 2016/0267132 A1 | 9/2016 | Castellanos et al. | |
| 2017/0006135 A1* | 1/2017 | Siebel | H04L 67/12 |
| 2017/0116343 A1 | 4/2017 | Wu et al. | |
| 2018/0191867 A1 | 7/2018 | Siebel et al. | |
| 2019/0034811 A1 | 1/2019 | Cuddihy et al. | |
| 2019/0087907 A1* | 3/2019 | Sale | G06F 16/24575 |

OTHER PUBLICATIONS

Denodo Technologies, "What is Data Virtualization?" Denodo Platform Overview, Denodo Platform 7.0 Goes Beyond Every Other Data Virtualization Solution, 19 Pages.

Nov. 10, 2017, Thor Olavsrud, "Why Your Bi Strategy Needs A Universal Semantic Data Layer", 3 Pages.

Dec. 17, 2014, Mahfuzul Amin, Rashedur M., "Universal Database Access Layer to Facilitate Query", 6 Pages.

Github, UK, "GaianDB", 64 Pages.

Jun. 23, 2021—(WO) International Search Report & Written Opinion—PCT/US21/025503.

Chromiak et al. "The Linkup Data Structure for Heterogeneous Data Integration Platform", International Conference on Future Generation Information Technology, Springer, Berlin, Heidelberg, 2012, Dec. 2012 (Dec. 2012), retrieved on May 29, 2021 (May 29, 2021) from «https://www.researchgate.net/publication/262411400_The_Linkup_Data_Structure_for_Heterogeneous_Data_Integration_Platform» entire document.

\* cited by examiner

UNIVERSAL ACCESS LAYER FOR ACCESSING HETEROGENEOUS DATA STORES

FIELD OF USE

Aspects of the disclosure relate generally to an abstraction layer and, more specifically, to an abstraction layer for accessing a plurality of heterogeneous data stores.

BACKGROUND

Data and/or information may be stored in a plurality of different, heterogeneous data stores. This may be a function of different business units having different storage requirements and/or new data storage technologies being rolled out over time. Because of the different data stores, application developers may have to write and/or modify code to access the data and/or information stored in the heterogeneous data stores. This may lead to errors in retrieving the data and/or information, for instance, if the developers are not familiar with the format of the stored data and/or where the data is stored. This may degrade the performance of the applications, the underlying network, and/or the data stores themselves.

Aspects described herein may address these and other problems, and generally improve the efficiency and performance of operations being performed on a plurality of heterogeneous data stores.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, and computer readable media are also within the scope of the disclosure.

Example methods and systems described herein disclose a universal access layer that may provide an abstraction layer between applications and one or more data stores. The universal access layer may allow an application to communicate with one or more data stores while the application may employ a different data format than at least one data store. In this regard, the universal access layer may transform the request to a suitable format for the data store and reformat the response for the application. Additionally, the universal access layer may parse requests for data and/or information to determine which of the one or more data stores contain the requested information. The universal access layer may then transmit separate requests for the data and/or information to each of the data stores. In response to receiving requests from each of the data stores, the universal access layer may aggregate the responses into a single response before sending the requested data and/or information to the requester. The universal access layer described herein may improve the speed with which applications access data and/or information from a plurality of heterogeneous data stores.

These features, along with many others, are discussed in greater detail below.

BRIEF DESCRIPTION OF THE DRAWINGS

The present disclosure is described by way of example and not limited in the accompanying figures in which like reference numerals indicate similar elements and in which.

DETAILED DESCRIPTION

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

By way of introduction, aspects discussed herein may relate to methods and techniques for a universal access layer that allows a plurality of applications to obtain data and/or information from a plurality of heterogeneous data stores without any additional code. The universal access layer may include one or more application data objects. The application data objects may be used to perform a variety of functions. In particular, the universal access layer may determine which data stores comprise the requested data and/or information and divide the request into a plurality of requests, each for a different data store. The universal access layer may receive a plurality of responses from each of the different stores and combine the plurality of responses into a single response that is provided to the application. As will become apparent from the discussion below, the universal access layer may improve the speed with which applications obtain data and/or information from heterogeneous data stores and improve the integrity of the data and/or information retrieved from those data stores.

Figure 1:
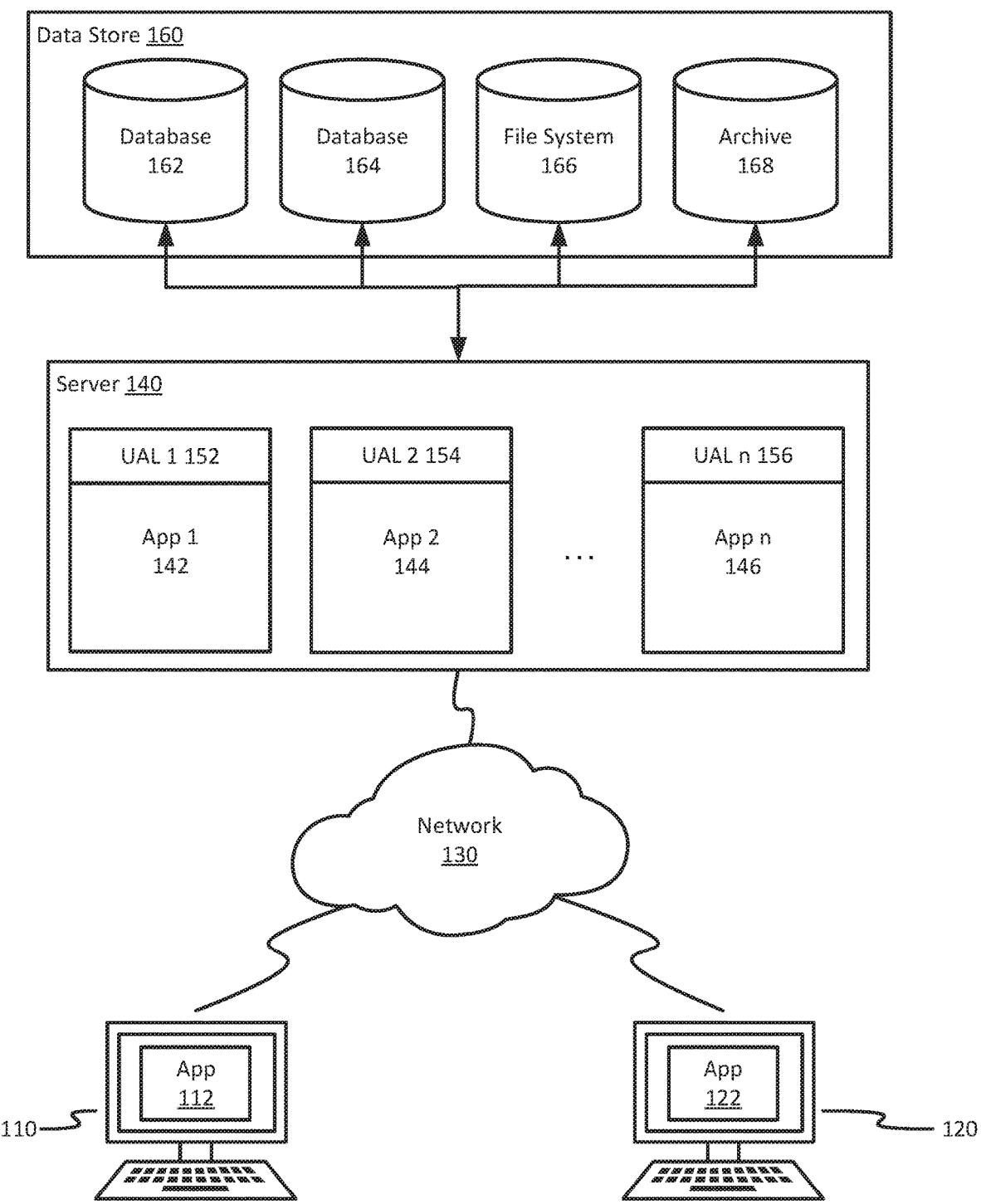
FIG. 1 shows an example of a system in which one or more aspects described herein may be implemented.

Turning to FIG. 1, a system 100 in which a universal access layer may be deployed is shown. System 100 may include a first computing device 110 and a second computing device 120 interconnected to a server 140 via network 130. Additionally, server 140 may be connected to a data store 160.

First computing device 110 may be any suitable computing device configured to perform the particular functions described herein. For example, first computing device 110 may be a mobile device, such as a cellular phone, a mobile phone, a smart phone, a tablet, or a laptop, and/or a personal computer, such as a terminal computing device, a desktop computing device, etc. First computing device 110 may provide a first user with access to a variety of applications and services. For example, first computing device 110 may provide the first user with access to the Internet. Additionally, first computing device 110 may provide the first user with one or more applications located thereon, including, for example, application 112. The one or more applications may provide the first user with a plurality of tools and access to a variety of services. For instance, application 112 may be a web browser that provides the first user with access to the Internet. The web browser may allow the first user to access one or more webpages, such as an insurance web page that may provide, for example, one or more rate quotes, insurance policies, etc. In this regard, the insurance web page served to the first user via application 112 may allow the first user to request data and/or information from an insurance provider. The request may be transmitted to server 140 via network 130. As will be discussed in greater detail below, server 140 may process the request and provide the first user with a response. The response may include, for example, one or more rate quotes, insurance policies, information about the user, etc. Server 140 may return the response to application 112, which may provide the response to the first user.

Second computing device 120 may be similar to the first computing device 110 discussed above. In this regard, the second computing device 120 may include any suitable computing device configured to allow a user to execute software for a variety of purposes as described herein. Second computing device 120 may belong to the first user that accesses first computing device 110, or, alternatively, second computing device 120 may belong to a second user, different from the first user. The software of second computing device 120 may include one or more web browsers that provide access to websites on the Internet. Additionally, or alternatively, second computing device 120 may include an application 122. In some embodiments, application 122 may be an application used by a professional in the performance of their duties. For example, application 122 may be an insurance program configured to allow an insurance agent to request data and/or information (e.g., quotes, insurance policies, etc.) on behalf of clients. In this regard, an agent may request the data and/or information through application 122. The request for data and/or information may be transmitted (e.g., sent) to server 140 for processing. Based on the request, server 140 may provide (e.g., respond) a response. In some instances, application 122 may provide the data and/or information to the agent, who may, in turn, provide the response to the client.

While application 112 and application 122 have been described as forward facing (e.g., external) applications, it will be appreciated that application 112 and application 122 may be internal applications configured to allow employees to obtain data and/or information in the performance of an employee's job functions. In this regard, application 112 may request data and/or information, such as user information, policy information, quote information, etc. As will be discussed in greater detail below, application 112 and/or application 122 may request information from one or more data stores (e.g., databases, file systems, archives, etc.) via a universal access layer, as will be discussed herein below. The universal access layer may format (e.g., transform) the request, transmit the request to one or more data stores, receive one or more responses from the one or more data stores, combine the one or more responses into a single response, and reformat the response before sending it to the requesting application.

Server 140 may be configured to execute one or more applications, processing engines, and/or microservices (e.g., mini-applications, sub-routines, libraries, etc.). Server 140 may be a stand-alone server, a corporate server, or a server located in a server farm or cloud-computing environment. According to some examples, server 140 may be a virtual server hosted on hardware capable of supporting a plurality of virtual servers. The one or more applications, processing engines, and/or microservices may perform a variety of processing on behalf of one or more applications. In one non-limiting example, server 140 may be a backend server for an insurance company. The backend server may be executing one or more backend applications (e.g., App 1 142, App 2 144, App n 146, etc.) configured to execute in tandem with one or more front-end applications (e.g., application 112, application 122). For example, one or more backend applications (e.g., App 1 142, App 2 144, App n 146, etc.) may be configured to calculate one or more insurance rates, generate one or more insurance products, and, otherwise, perform a plurality of insurance related tasks. In performance of these tasks, the one or more backend applications (e.g., App 1 142, App 2 144, App n 146, etc.) may be configured to access data store 160. Each of the applications (e.g., App 1 142, App 2 144, App n 146, etc.) may include a universal access layer (e.g., UAL 1 152, UAL 2 154, UAL 3 156). The universal access layer may provide an abstraction layer that allows applications to communicate with one or more data stores (e.g., data store 160). As will be discussed in greater detail below, the universal access layer may include one or more application data objects configured to validate the request for data and/or information, transform a format of the request (if necessary or desired), determine which data stores comprise the requested data and/or information, encrypt the request (if necessary or desired), combine the responses into a single response, and retransform the response prior to sending it to the requesting application. By using the universal access layer, applications may improve the speed with which they access data and/or information from a plurality of heterogeneous data stores.

Data store 160 may comprise a plurality of heterogeneous data stores. For example, data store 160 may include a first database 162, a second database 164, a file system 166, and/or an archive 168. First database 162 and/or second database 164 may include, but are not limited to relational databases, hierarchical databases, distributed databases, in-memory databases, flat file databases, XML databases, NoSQL databases, graph databases, and/or a combination thereof. First database 162 and second database 164 may be the same type of database. Alternatively, first database 162 and second database 164 may be different types of databases. First database 162 and/or second database 164 may be configured to store data and/or information, including user information, such as personally identifiable information (PII) (e.g., the user's name, social security number, driver's license number, passport number, bank account information, address information, email address(es), phone number, etc.). First database 162 and/or second database 164 may also be configured to store additional data and/or information, including insurance information (e.g., a claims database, an underwriting database, insurance customer database, local information database, rate worksheets, etc.). File system 166 may define how data is stored and/or retrieved in data store 160. File system 166 may comprise a plurality of data and/or information, including, for example, various files used by the various applications. In this regard, the files may include policy templates, existing policies, etc. Archive 168 may be a distributed file system (e.g., Hadoop) configured to store data and/or information, as well as execute a plurality of applications. Archive 168 may be configured to record transactions (e.g., database reads, database writes) made to the data store 160 via network 130.

Network 130 may include any type of network. In this regard, network 130 may include the Internet, a local area network (LAN), a wide area network (WAN), a wireless telecommunications network, a corporate network, a distributed corporate network, and/or any other communication network or combination thereof. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, Wi-Fi, WiMAX and LTE, is presumed, and the various computing devices described herein may be configured to communicate using any of these network protocols or technologies. The data transferred to and from various computing devices in system 100 may include secure and sensitive data, such as confidential documents, customers' personally identifiable information (PII), and account data. Therefore, it may be desirable to protect transmissions of such data using secure network protocols and encryption, and/or to protect the integrity of the data when stored on the various computing devices. For example, a file-based integration scheme or a service-based integration scheme may be utilized for transmitting data between the various computing devices. Data may be transmitted using various network communication protocols. Secure data transmission protocols and/or encryption may be used in file transfers to protect the integrity of the data, for example, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the system 100. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML, encryption. Specialized hardware may be used to provide secure web services. For example, secure network appliances may include built-in features such as hardware-accelerated SSL and HTTPS, WS-Security, and/or firewalls. Such specialized hardware may be installed and configured in system 100 in front of one or more computing devices such that any external devices may communicate directly with the specialized hardware.

Figure 2:
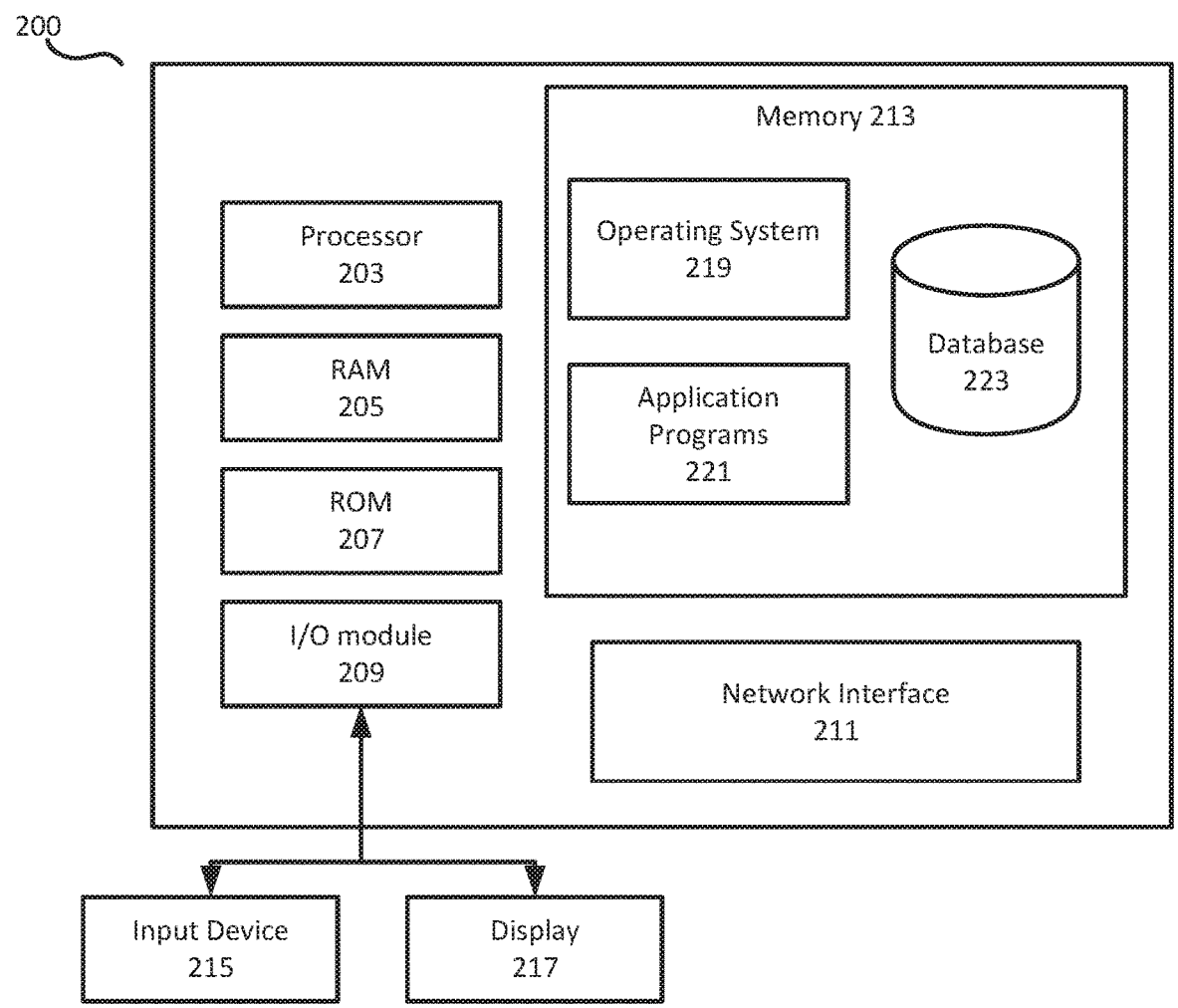
FIG. 2 shows an example of a computing device in accordance with one or more aspects described herein.

Any of the devices and systems described herein may be implemented, in whole or in part, using one or more computing systems described with respect to FIG. 2. FIG. 2 shows an example of a computing device 200. Computing device 200 may be similar to first computing device 110 and/or second computing device 120, discussed above. Additionally or alternatively, computing device 200 may be similar to server 140.

Computing device 200 may include one or more processors 203. Processor 203 may include a single central processing unit (CPU), which may be a single-core or multi-core processor. Alternatively, processor 203 may include multiple CPUs or a plurality of multi-core processors. Processor(s) 203 and associated components may allow the computing device 200 to execute a series of computer-readable instructions to perform some or all of the methods, processes, and/or algorithms described herein. Processor(s) 203 may be capable of controlling operations of computing device 200 and its associated components, including RAM 205, ROM 207, an input/output (I/O) module 209, a network interface 211, and memory 213. For example, processor(s) 203 may be configured to read/write computer-executable instructions and other values from/to the RAM 205, ROM 207, and memory 213.

The I/O module 209 may be configured to be connected to an input device 215, such as a microphone, keypad, keyboard, touchscreen, and/or stylus through which a user of the computing device 200 may provide input data. The I/O module 209 may also be configured to be connected to a display device 217, such as a monitor, television, touchscreen, etc., and may include a graphics card. The display device 217 and input device 215 are shown as separate elements from computing device 200; however, they may be within the same structure.

The memory 213 may be any computer-readable medium for storing computer-executable instructions (e.g., software). The instructions stored within memory 213 may enable computing device 200 to perform various functions, including the methods, processes, and/or algorithms described herein. For example, memory 213 may store software used by computing device 200, such as an operating system 219 and application programs 221, and may include an associated database 223.

Although not shown in FIG. 2, various elements within memory 213 or other components in computing device 200, may include one or more caches, for example, CPU caches used by the processing unit 203, page caches used by the operating system 219, disk caches of a hard drive, and/or database caches used to cache content from database 223. For embodiments including a CPU cache, the CPU cache may be used by one or more processors in the processor 203 to reduce memory latency and/or access time. In such examples, the processor 203 may retrieve data from and/or write data to the CPU cache rather than reading/writing to memory 213, which may improve the speed of these operations. In some examples, a database cache may be created in which certain data from a central database such as, for example, first database 162 and/or second database 164, is cached in a separate smaller database on an application server separate from the database server. For instance, in a multi-tiered application, a database cache on an application server can reduce data retrieval and/or data manipulation time by not needing to communicate over a network with a backend database server. These types of caches and others may be included in various embodiments, and may provide potential advantages in certain implementations of retrieving and analyzing field data and/or local data, such as faster response times and less dependence on network conditions.

The network interface 211 may allow computing device 200 to connect to, and communicate with, a network, such as network 130. As noted above, network 130 may be any type of network, including a local area network (LAN) and/or a wide area network (WAN), such as the Internet, a cellular network, or satellite network. Through the network 130, computing device 200 may communicate with one or more other computing devices, such as server 140 and/or data store 160, to exchange data and/or information. The network interface 211 may connect to the network (e.g., network 130) via communication lines, such as coaxial cable, fiber optic cable, etc., or wirelessly using a cellular backhaul or a wireless standard, such as IEEE 802.11, IEEE 802.15, IEEE 802.16, etc. Further, the network interface 211 may use various protocols, including TCP/IP, Ethernet, File Transfer Protocol (FTP), Hypertext Transfer Protocol (HTTP), etc., to communicate with other computing devices, servers 140, and the like.

Figure 3:
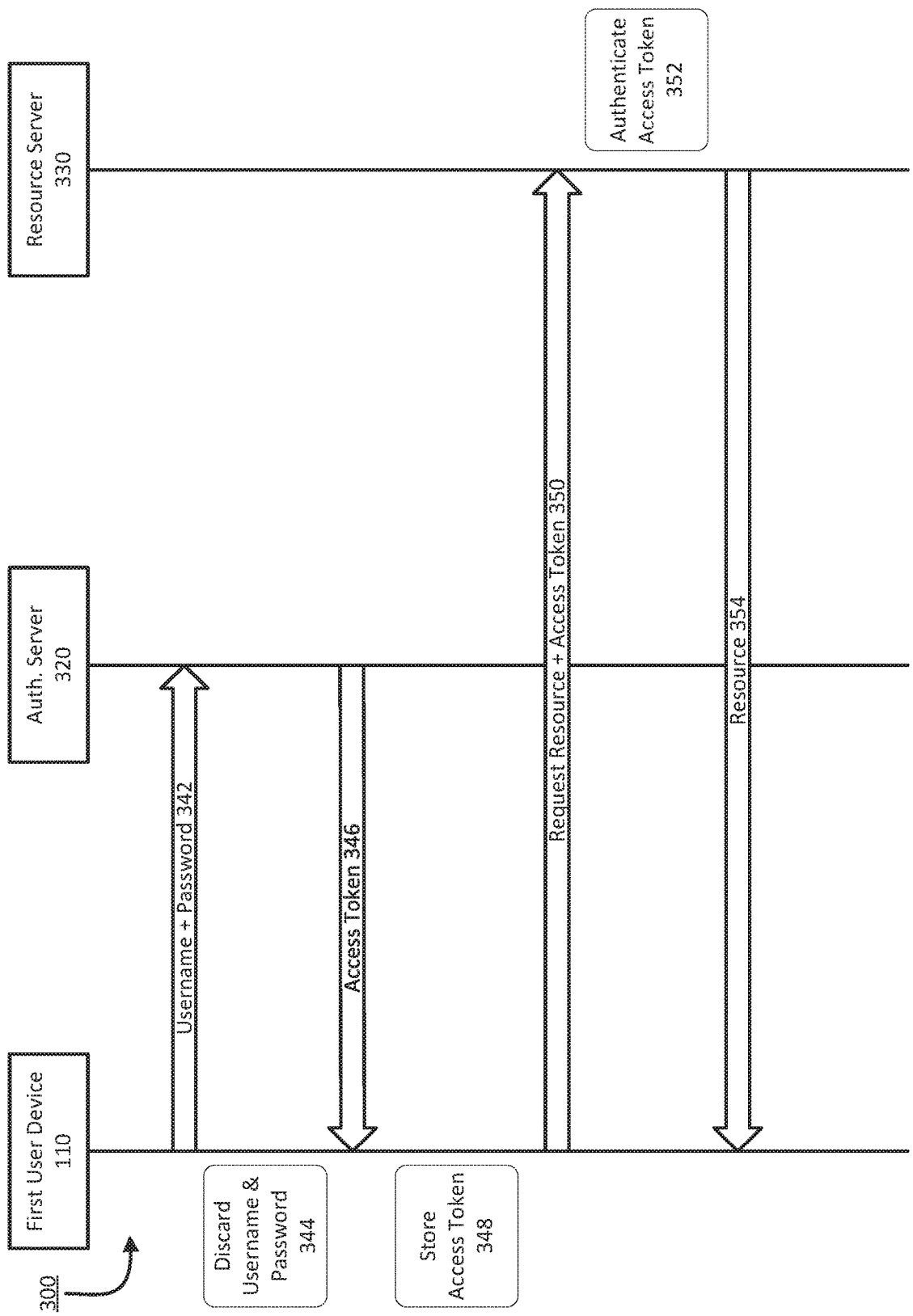
FIG. 3 shows an example of an authentication process for gaining access to a resource according to one or more aspects of the disclosure.

Applications and/or users may request data and/or information from a server, database, etc. In some instances, the application and/or user may have to be authenticated prior to being granted access to the requested data and/or information. FIG. 3 shows an example of an authentication process 300 for gaining access to a resource (e.g., data, information, an application, etc.).

As step 342, a first device 110 may transmit a request for an access token to an authentication server 320. The request for the access token may include authentication information, such as a username and password. While a username and password is shown in FIG. 3, it will be appreciated that any suitable authentication technique may be used when requesting the access token from the authentications server 320. In step 344, the first user device 110 may discard the authentication information (e.g., username and password). In step 346, the first device 110 may receive an access token from authentication server 320. The access token may be an application programming interface key (API key) configured to authenticate the first device 110 (e.g., a user, developer, or program executing on first device 110) to a resource server, such as resource server 330. In step 348, the first user device 110 may store the access token. The access token may be stored in a secure memory location. When the first device 110 wants to access the resource, a request for the resource and the access token may be transmitted from the first user device 110 to resource server 330 in step 350. In step 352, the resource server 330 may authenticate the access token received in the request. If the access token fails authentication (e.g., for being expired or fraudulent), the resource server 330 may deny the request to access the resource. In some instances, resource server 330 may send (e.g., transmit) a notification to the first user device 110 indicating that the request is being denied. However, when the access token is authenticated, the resource server 330 may provide the first user device 110 with access to the resource in step 354. Providing the first user device 110 with access to the resource may include providing the first user device 110 with requested data and/or information. Additionally or alternatively, providing the first user device 110 with access to the resource may include allowing the first user device 110 to access one or more applications located on resource server 330.

Figure 4:
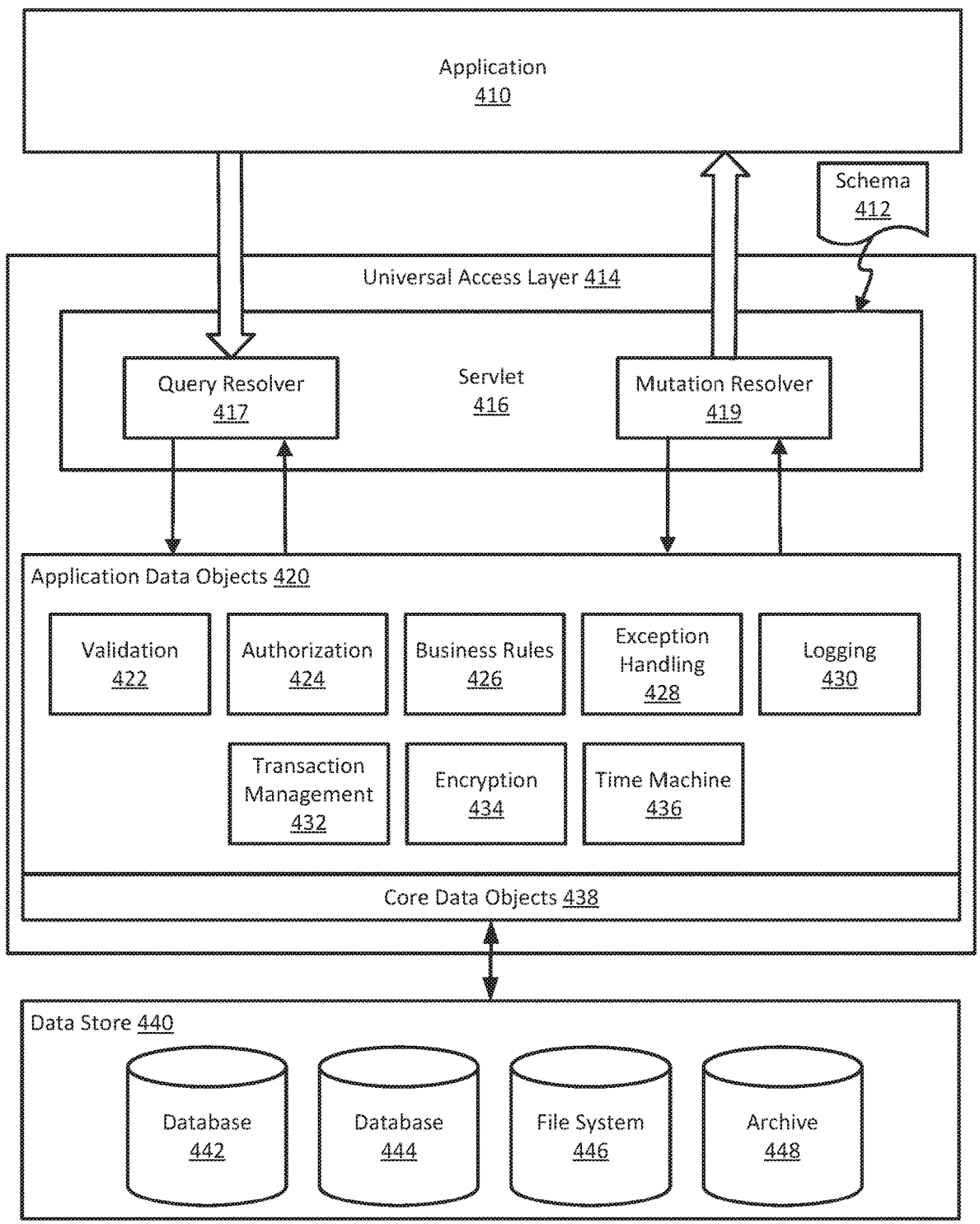
FIG. 4 shows an example of the universal access layer handling requests for data and/or information from an application according to one or more aspects of the disclosure.

As noted above, requesting a resource may include a request for data and/or information. In particular, the request may comprise a plurality of pieces of information (e.g., name, address, insurance information, etc.) stored in a plurality of heterogeneous data stores. The universal access layer may provide applications with access to data stored in these heterogeneous data stores. FIG. 4 illustrates an example of the universal access layer handling requests for data and/or information from an application according to one or more aspects of the disclosure.

FIG. 4 shows an application 410, a universal access layer 414, and a data store 440. As noted above, application 410 may be a front-end application and/or a backend application configured to obtain data and/or information from data store 440. In this regard, application 410 may issue a read request as part of the retrieval process. Typical systems may scale up by implementing both read and write channels. However, this may prove impractical since most operations tend to be read operations. To address this, the universal access layer 414 may implement a Command Query Responsibility Segregation (CQRS) architecture. The CQRS architecture may separate reading and writing into two different models. This may allow one operation (e.g., reading) to be scaled up without having to scale up writing operations. The CQRS architecture that allows one operation (e.g., reading) to scale up without having to scale up the other operation (e.g., writing) improves overall system performance by reducing the amount of resources used for unused network traffic.

Data store 440 may comprise a first database 442, a second database 444, a file system 446, and/or an archive 448 which may be similar to first database 162, second database 164, file system 166, and/or archive 168, respectively. In certain non-limiting embodiments, data store 440 may also include a cache (not shown). The cache may be any suitable cache and/or message broker, such as Microsoft® Azure Redis Cache. In this regard, cache may broker requests and/or responses between the data store 440 and the universal access layer 414.

Universal access layer 414 may be configured to provide an application with access to data and/or information stored in a plurality of heterogeneous data stores, such as those located in data store 440. By using universal access layer 414, application 410 need not be concerned with where the data and/or information is stored. Moreover, application developers may focus on writing business logic for the applications they are developing and do not need to worry about writing retrieval logic. This provides an improved ecosystem for application development, while improving the speed with which applications obtain data and/or information from heterogeneous data stores and the integrity of the data and/or information retrieved from those data stores.

The universal access layer 414 may comprise a servlet 416. Servlet 416 may be an application programming interface (API) that allows the universal access layer 414 to communicate and/or interact with application 410. In some instances, servlet 416 may be an open source component, such as GraphQL. In particular, servlet 416 may receive a request in a query format (e.g., query structure). The servlet 416 may express the query format in an object schema, for example, by referring to schema 412. In this regard, schema 412 may define a canonical model. The canonical model may define a schema, or common data format, that allows (e.g., permits) communication between applications that use different data formats. Model methodologies may be considered either bottom-up or top-down. Bottom-up modelling methodologies may be the result of re-engineering and, typically, start with existing data structures. Bottom-up modelling may be physical and application-specific, and also incomplete from an enterprise-wide perspective. Top-down modelling, on the other hand, may be an abstract technique for gathering information from experts. In this regard, the system may not implement all the entities in a top-down logical model; however, the top-down logical model may serve as a reference point and/or template for enabling data of varying formats to be exchanged seamlessly. Using the model defined in schema 412, the servlet 416 may be able to express query structure as an object schema.

Servlet 416 may also comprise query resolver 417 and mutation resolver 419. Query resolver 417 and/or mutation resolver 419 may comprise instructions for transforming an operation into data. For example, query resolver 417 may transform a request (e.g., query) into data that is suitable for the application data objects 420, described in greater detail below. Similarly, mutation resolver 419 may comprise instructions for transforming data into a different format more suitable for the application data objects 420. In some examples, query resolver 417 and/or mutation resolver 419 may communicate with one or more application data objects (ADOs) 420 to transform the received query structure into an object schema.

ADOs 420 may comprise one or more objects (e.g., libraries, routines, sub-routines, etc.) configured to process the requests for data and/or information. As shown in FIG. 4, there are eight ADOs: validation ADO 422, authorization ADO 424, business rules ADO 426, exception handling ADO 428, logging ADO 430, transaction management ADO 432, encryption ADO 434, and time machine ADO 436. While eight ADOs are shown in FIG. 4, it will be appreciated that more, or fewer, ADOs may be deployed.

Validation ADO 422 may be configured to validate the format of the request for data and/or information. In this regard, application 410 may format data requests in a format different from the format used by the data store 440. For example, application 410 may format data, and requests for data, in a CSV format. However, the data store 440 may handle requests in JSON form. As noted, above, universal access layer 414 may transform (e.g., translate) the request from the first format to a second format. Validation ADO 422 may verify that the request is in the proper format. Additionally or alternatively, validation ADO 422 may determine whether the request for information complies with the canonical model defined by schema 412. Validation ADO 422 may transform the request for data and/or information based on a determination that the request does not comply with the canonical model 412.

Authorization ADO 424 may be configured to determine whether a user device (e.g., user, application, device, etc.) is authorized to access the requested data and/or information. In this regard, authorization ADO 424 may verify (e.g., authenticate) a token received with the request for data and/or information. In some instances, authorization ADO 424 may include a table of authenticated access tokens. Additionally or alternatively, authorization ADO 424 may send (e.g., transmit) the access token to a server, such as an authentication server. Authorization ADO 424 may receive a response from the server indicating whether the access token is valid or not. When the access token is valid, authorization ADO 424 may allow the request to pass to one or more of the data stores. However, when the access token is invalid, authorization ADO 424 may deny the request for data and/or information. In some instances, authorization ADO 424 may notify the application (e.g., application 410) that the request has been denied.

In response to a determination that the application is authorized to access the requested information, business rules ADO 426 may parse the request for data and/or information to extract individual pieces of information. For example, a request received from application 410 may include requests for a plurality of pieces of information. For example, the request may request personally identifiable information (PII) associated with a name (e.g., First Name Last Name), as well as any insurance policies associated with the name. In this regard, the PII may be stored in a first data store and the insurance policies may be stored in a second data store. The first data store and the second data sore may be different data stores. Business rules ADO 426 may parse the request to determine what information is being requested. After parsing the request, business rules ADO 426 may determine a first location of a first piece of information and a second location of a second piece of information. In some instances, business rules ADO 426 may use a look-up table to determine the first location and/or the second location. Business rules ADO 426 may also combine pieces of data and/or information received from a plurality of heterogeneous data stores into a single response that is returned to the requester (e.g., application 410).

After the location of the requested information is determined, encryption ADO 434 may determine whether any of the requests should be encrypted. Requests may need to be encrypted, for example, if the request is for PII and/or other sensitive and/or confidential data and/or information. Based on a determination that a request for data and/or information should be encrypted, encryption ADO 434 may encrypt the request for the data and/or information prior to transmitting the request to the data store. Similarly, a response received from a data store may be encrypted. Accordingly, encryption ADO 434 may decrypt the encrypted data and/or information received from the data store prior to combining the data and/or information into a response provided to the requester (e.g., application 410). If the request does not need to be encrypted, the processing of encryption ADO 434 may be skipped.

After the requests have been divided and encrypted, transaction management ADO 432 may transmit one or more requests to the data store 440. For example, transaction management ADO 432 may transmit a first request for a first piece of data and/or information to a first data store and a second request for a second piece of data and/or information to a second data store. Similarly, transaction management ADO 432 may receive the first piece of data and/or information from the first data store and the second piece of data and/or information from the second data store. In some instances, transaction management ADO 432 may include a table for recording (e.g., tracking) which responses correspond to which requests.

If any exceptions occur during the request for data and/or information, exception handling ADO 428 may process those exceptions. Exception handling ADO 428 may determine whether any exceptions occurred. Additionally, exception handling ADO 428 may map error codes to application-specific error codes in order to notify the requesting application of the error. If exception handling ADO 428 determines that an exception occurred, exception handling ADO 428 may log the exception. The exception may be logged in one of the plurality of heterogeneous stores in data store 440. Logging ADO 430 may log each of the requests for data and/or information and each of the responses. Logging ADO 430 may create a record (e.g., transaction record) for each request and/or response for recordkeeping purposes. After a predetermined amount of time (e.g., 1 day, 1 week, 1 month), the records generated by logging ADO 430 may be stored in a file history data store (e.g., archive 448) by time machine ADO 436. In this regard, time machine ADO 436 may store transaction records for longer periods of time (e.g., 1 year, 3 years, 5 years, etc.). Time machine ADO 436 may allow the transaction records to be searched (e.g., queried). Accordingly, time machine ADO 436 may provide historical records of requests and responses for data and/or information.

The plurality of ADOs may communicate with data store 440 via one or more core data objects 438. The one or more core data objects 438 may map requests and/or responses between the plurality of ADOs and data store 440. In a non-limiting example, the one or more core data objects may comprise low-level logic to generate appropriate queries for the data store 440 and response for the plurality of ADOs. The low-level logic may open and teardown connections between the plurality of ADOs and data store 440. Additionally, the low-level logic may generate queries and format responses for the plurality of ADOs.

Figure 5:
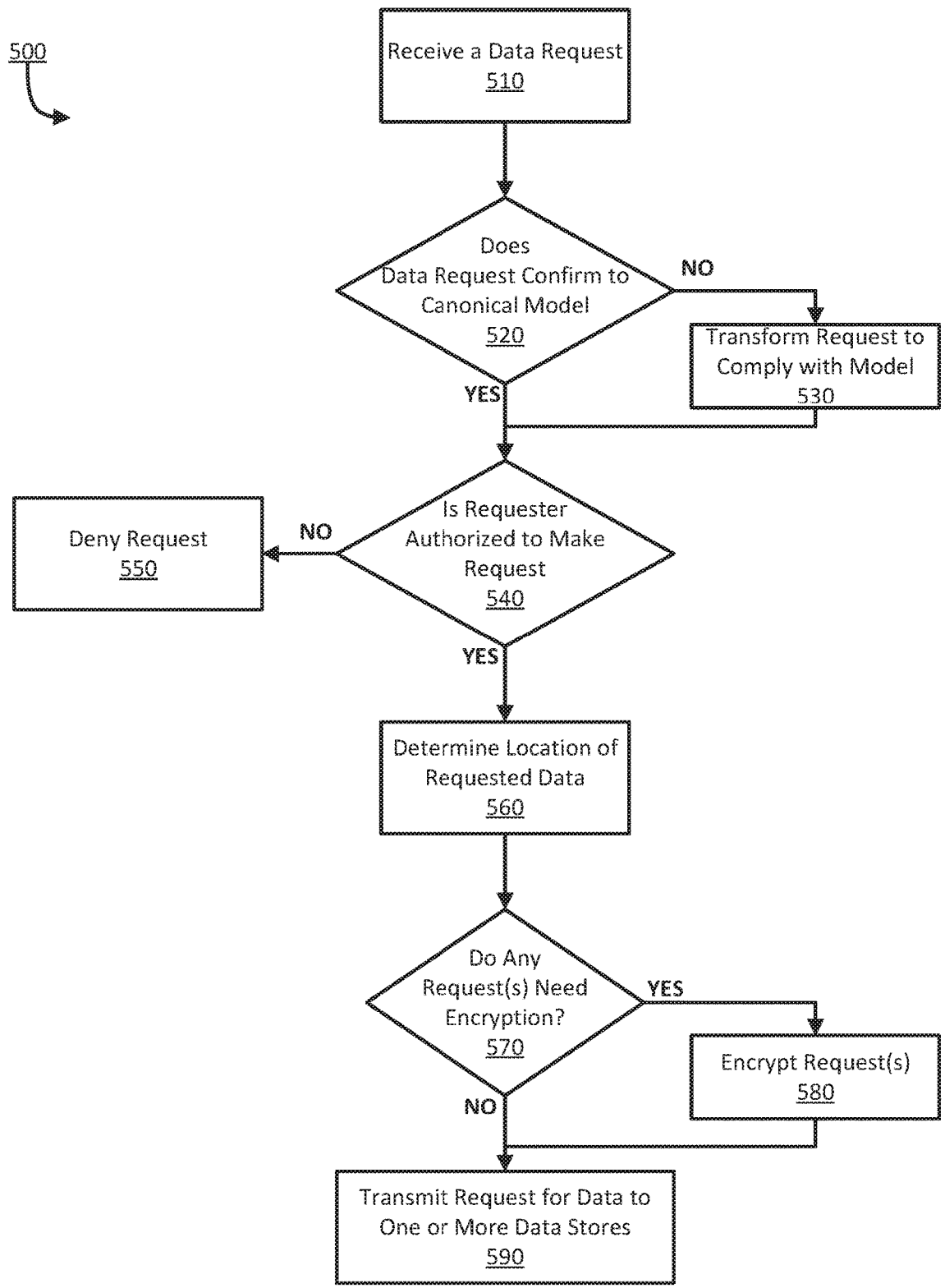
FIG. 5 shows an example of a process for handling a request for data and/or information according to one or more aspects of the disclosure.

A universal access layer may be deployed to allow a plurality of applications to access data maintained in a plurality of heterogeneous data stores. FIG. 5 shows a flow chart of a process for handling a request for data and/or information according to one or more aspects of the disclosure. Some or all of the steps of process 500 may be performed using one or more computing devices as described herein.

In step 510, a first computing device (e.g., the universal access layer executing on one or more computing devices) may receive a request for data and/or information. The request may be received from a second computing device (e.g., an application executing on the second computing device). The request for data and/or information may include, for example, a request for customer information.

In step 520, the first computing device (e.g., the universal access layer executing on one or more computing devices) may determine whether the request for data and/or information complies with a canonical model. As discussed above with respect to FIG. 4, the canonical model may define a schema, or common data format, to allow (e.g., permit) communication between applications and/or data stores that use different data formats. If the request does not comply with the canonical model, the first computing device may transform the request to comply with the canonical model in step 530. After transformation (or if the request complies with the canonical model), the first computing device may determine whether the requester (e.g., second computing device, requesting application, requesting user, etc.) is authorized to access the data and/or information in step 540. In this regard, the request for data and/or information may include an access token (e.g., an API key). The first computing device may authenticate the access token received in the request. If the access token is not authenticated, the request may be denied in step 550. If the access token is authenticated, process 500 may determine one or more locations of the requested data in step 560. As discussed above, the first computing device may parse the request for data and/or information to extract the information being sought. That is, a single request for data and/or information may be seeking several pieces of data and/or information. The several pieces of data and/or information may be stored in a plurality of different heterogeneous data stores. Accordingly, the first computing device may divide the single request into one or more requests for data and/or information. The first computing device may then use a look-up table to determine the location of each piece of information requested by the second computing device.

In step 570, the first computing device (e.g., the universal access layer executing on one or more computing devices) may determine whether any of the requests for the data and/or information should be encrypted. If the first computing device determines that one or more of the requests should be encrypted, the first computing device may encrypt those requests in step 580. The first computing device may use an encryption key (e.g., a symmetric key) shared with the data store and an encryption algorithm (e.g., symmetric encryption algorithm) to encrypt the request. Alternatively, the first computing device may use a public encryption key associated with the data store and an asymmetric encryption algorithm to encrypt the request. After encrypting the request (or if the request does not need to be encrypted), the first computing device may transmit the requests for data and/or information to one or more data stores in step 590.

Figure 6:
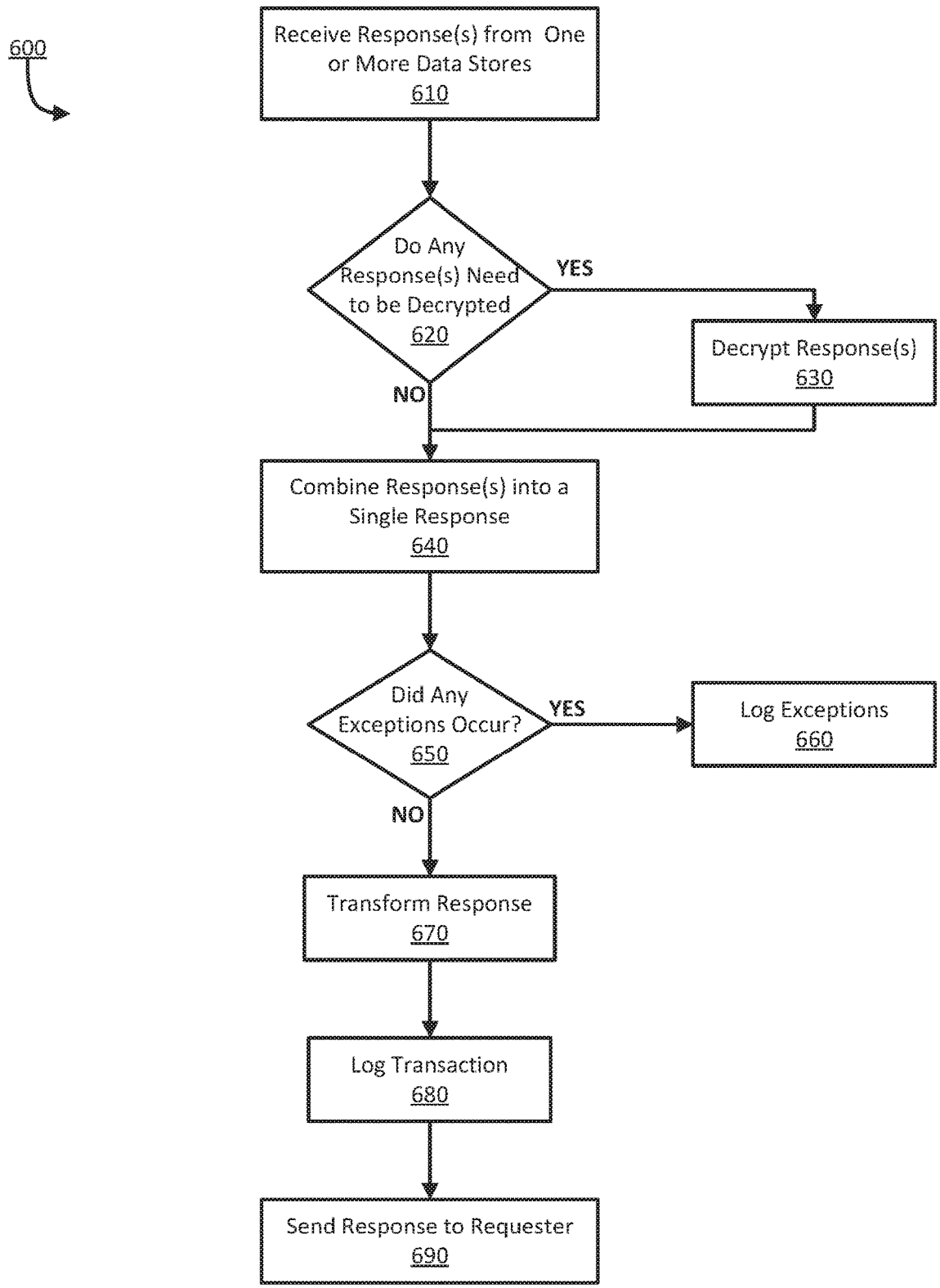
FIG. 6 shows an example of a process for handling a response to a request for data and/or information according to one or more aspects of the disclosure.

After submitting one or more requests for data and/or information to a plurality of heterogeneous data stores, the universal access layer may aggregate the data and/or information and provide the data and/or information to the requester. FIG. 6 shows a flow chart of a process 600 for handling a response to a request for data and/or information according to one or more aspects of the disclosure. Some or all of the steps of process 600 may be performed using one or more computing devices as described herein.

In step 610, the first computing device (e.g., the universal access layer executing on one or more computing devices) may receive responses from one or more data stores. In step 620, the first computing device (e.g., the universal access layer executing on one or more computing devices) may determine whether any of the responses need to be decrypted. If the first computing device determines that one or more of the responses need to be decrypted, the first computing device may decrypt those requests in step 630. The first computing device may use the decryption technique that corresponds to the encryption algorithm used by the data store. For instance, the first computing device (e.g., the universal access layer) may use a private key associated with the first computing device to decrypt the one or more responses. Alternatively, the first computing device may use a symmetric key shared with the one or more data stores. After decrypting the one or more responses (or if the responses do not need to be decrypted), the first computing device may combine (e.g., aggregate) each of the responses into a single response at step 640. In step 650, the first computing device (e.g., the universal access layer executing on one or more computing devices) may determine whether any exceptions occurred in obtaining the data and/or information. Based on a determination that one or more exceptions occurred, the exception may be logged in step 660. If no exceptions occurred, then process 600 proceeds to step 670 wherein the first computing device may transform the response into a format suitable for the requester. The transformation may be based on a determination that the request for information did not comply with the canonical model. If the request did comply with the canonical model, then the response may not need to be transformed and step 670 may be skipped. In step 680, the first computing device (e.g., the universal access layer executing on one or more computing devices) may log the request for data and/or information and the corresponding response. In step 690, the first computing device (e.g., the universal access layer executing on one or more computing devices) may send the response to the requester.

The universal access layer described herein provides several advantages and improvements over other abstraction layers. First, app developers may focus on developing the business logic for developing an application that performs one or more requested functions without having to develop the logic for accessing data from a plurality of heterogeneous data stores. Further, the universal access layer may manage the location of data, thereby improving an application's performance by providing requested data and/or information more quickly. Additionally, the universal access layer may ensure that data is not corrupted in exchange between the requester and the data store. That is, the universal access layer improves the integrity of the data and/or information amongst a plurality of different applications that format data differently. These advantages improve the speed with which applications obtain data and/or information from heterogeneous data stores and improve the integrity of the data and/or information retrieved from those data stores.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like that perform particular tasks or implement particular abstract data types when executed by a processor in a computer or other device. The modules may be written in a source code programming language that is subsequently compiled for execution, or may be written in a scripting language such as (but not limited to) HTML or XML. The computer-executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer-executable instructions and computer-usable data described herein. Various aspects discussed herein may be embodied as a method, a computing device, a system, and/or a computer program product.

Although many example arrangements described herein are discussed in the context of insurance applications, aspects described herein may be used in different industries and for different applications or products without departing from the invention. Further, although the present invention has been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A method comprising:
receiving, from a device, a request for information in which the requested information includes a first piece of information and a second piece of information;
determining whether the request for information complies with a canonical model;
determining, based on a determination that the request for information complies with the canonical model, whether the device is authorized to access the requested information;
determining that the first piece of information includes personally identifiable information and the second piece of information includes insurance information data;
determining, based on the device being authorized to access the requested information, a first location of the first piece of information and a second location of the second piece of information, wherein the first location and the second location are at different data stores;
encrypting a first request for the first piece of information in response to the first piece of information including the personally identifiable information;
transmitting the first request for the first piece of information as an encrypted request to a first data store;
transmitting a second request for the second piece of information to a second data store, the second request being an unencrypted request based on the second piece of information including the insurance information data;
receiving the first piece of information from the first data store;
receiving the second piece of information from the second data store;
combining the first piece of information and the second piece of information into a response; and
transmitting, to the device, the response including the requested information.

2. The method of claim 1, further comprising:
transforming the request for information based on a determination that the request for information does not comply with the canonical model.

3. The method of claim 1, wherein determining that the device is authorized to access the requested information further includes verifying a token received with the request for information.

4. The method of claim 1, further comprising:
denying the request for information based on a determination that the device is not authorized to access the requested information.

5. The method of claim 1, wherein determining the first location of the first piece of information and the second location of the second piece of information further comprises:
parsing the request for information to extract the request for the first piece of information and the request for the second piece of information;
determining, using a look-up table, the first location of the first piece of information; and
determining, using the look-up table, the second location of the second piece of information.

6. The method of claim 1, wherein the first piece of information received from the first data store is an encrypted first piece.

7. The method of claim 6, further comprising:
decrypting the encrypted first piece of information prior to combining the first piece of information and the second piece of information into the response.

8. The method of claim 1, further comprising:
determining whether any exceptions occurred in obtaining the first piece of information and the second piece of information; and
logging an exception based on one or more exceptions occurring while obtaining the first piece of information and the second piece of information.

9. The method of claim 1, further comprising:
transforming the response based on a determination that the request for information did not comply with the canonical model.

10. The method of claim 1, further comprising:
logging the request for information and the response.

11. One or more non-transitory media storing instructions that, when executed by one or more processors, cause the one or more processors to perform steps comprising:
receiving, from a device, a request for information, wherein the requested information includes a first piece of information and a second piece of information;

determining whether the request for information complies with a canonical model;

determining, based on a determination that the request for information complies with the canonical model, whether the device is authorized to access the requested information;

determining that the first piece of information includes personally identifiable information, and the second piece of information includes insurance information data;

determining, based on the device being authorized to access the requested information, a first location of the first piece of information and a second location of the second piece of information, wherein the first location and the second location are at different data stores;

encrypting a first request for the first piece of information in response to the first piece of information including the personally identifiable information;

transmitting the first request for the first piece of information to a first data store;

transmitting a second request for the second piece of information to a second data store as an unencrypted request based on the second piece of information including the insurance information data;

receiving the first piece of information from the first data store;

receiving the second piece of information from the second data store;

combining the first piece of information and the second piece of information into a response; and transmitting the response including the requested information.

12. The one or more non-transitory media of claim 11, further comprising instructions that cause the one or more processors to perform steps comprising:

decrypting an encrypted first piece of information received from the first data store prior to combining the first piece of information and the second piece of information into the response.

13. The one or more non-transitory media of claim 11, further comprising instructions that cause the one or more processors to perform steps comprising:

transforming the response based on the request for information not complying with the canonical model.

14. A method comprising:

receiving, from a device, a request in which requested information includes a first piece of information and a second piece of information;

determining that the request complies with a canonical model;

determining, based on the request complying with the canonical model, that the device is authorized to access the requested information;

determining that the first piece of information includes personally identifiable information, and the second piece of information includes insurance information data;

determining, based on the device being authorized to access the requested information, a first location of the first piece of information and a second location of the second piece of information, wherein the first location and the second location are at different data stores;

determining that the first piece of information should be encrypted based on the first piece of information including the personally identifiable information;

determining that the second piece of information does not need encryption based on the second piece of information including the insurance information data;

transmitting a first request for the first piece of information to a first data store and a second request for the second piece of information to a second data store, the first request being an encrypted request and the second request being an unencrypted request;

receiving the first piece of information from the first data store and the second piece of information from the second data store;

combining the first piece of information and the second piece of information into a response; and transmitting, to the device, the response including the requested information.

15. The method of claim 14, wherein the personally identifiable information includes user information of the device, and the insurance information data includes an insurance policy.

16. The method of claim 14, wherein:

the device is a personal computing device;

the first request and the second request are transmitted from an enterprise device; and the enterprise device communicates with the first data store and the second data store through a secure connection inaccessible to the personal computing device.

17. The method of claim 14, further comprising:

performing an insurance policy calculation using the first piece of information and the second piece of information, the response includes the insurance policy calculation.

18. The method of claim 14, wherein the first data store is user information database, and the second data store is at least one of:

a claims database;

an underwriting database; or a rate worksheet.

19. The method of claim 14, wherein determining that the second piece of information does not need encryption is based on the second piece of information being formatted as insurance underwriting data or as rate worksheet data.

20. The method of claim 14, further comprising:

storing, a first predetermined amount of time after receiving the second piece of information, a record of the second request and the insurance information data in a searchable format for a second predetermined period of time, the second predetermined period of time being longer than the first predetermined amount of time.

* * * * *